United States Patent Office 3,465,534
Patented Sept. 9, 1969

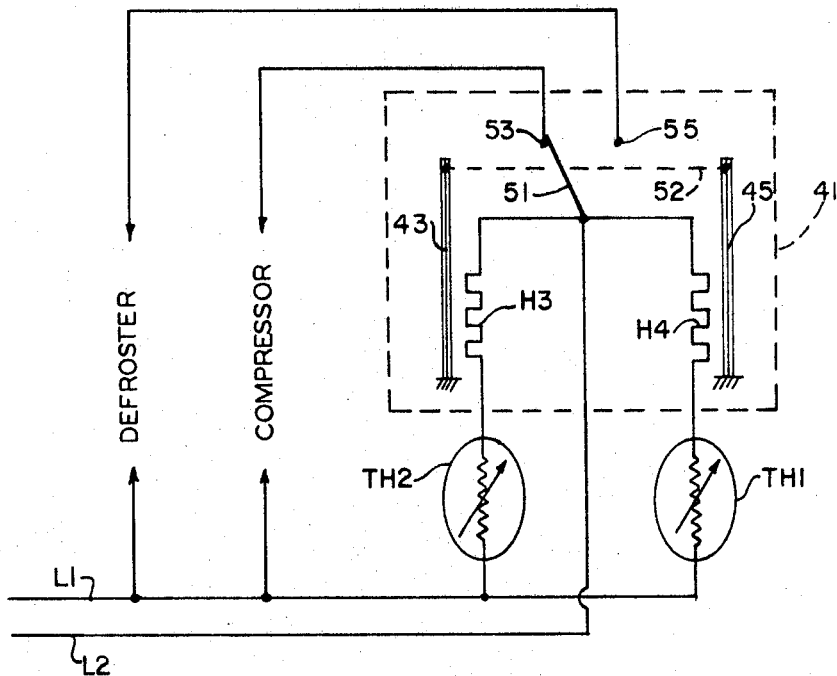

3,465,534
DIFFERENTIAL FLOW SENSING APPARATUS
Walter T. Sutton, Jr., and James D. Broyles, Lexington, and Manfred U. Schweiger, Versailles, Ky., assignors to Texas Instruments Incorporated, Dallas, Tex., a corporation of Delaware
Filed Oct. 31, 1967, Ser. No. 679,334
Int. Cl. F25d 21/02, 21/08
U.S. Cl. 62—151                           12 Claims

ABSTRACT OF THE DISCLOSURE

Apparatus is disclosed for defrosting the evaporator of a refrigerator when the flow of air through the evaporator becomes relatively obstructed by frost. The flow of air through the evaporator is measured with respect to the air flow in a reference path which bypasses the evaporator. The flow rates are sensed by a pair of self-heating thermistors, one thermistor being located in each of the paths. The thermistors are constructed of a semiconductor material having a transition temperature above which the resistance of the material rises abruptly. Thus, when current is applied to the thermistors to cause them to self-heat, the abruptly rising resistance characteristic causes the thermistors to be self-regulating at the transition temperature. Accordingly, the power dissipated from and consumed by each thermistor, above a certain threshold in air velocity, varies as a substantially linear function of the air velocity in the respective path and a difference between the respective power consumptions of the two thermistors is then a measure of the difference between the air velocities in the two paths. When this velocity difference exceeds a preselected level a defrosting cycle is initiated.

---

This invention relates to differential flow sensing apparatus and more particularly to a defrost control employing a differential air flow sensor.

It has previously been proposed to employ the temperature variation of a heater which is exposed to a fluid flow as a measure of the fluid velocity and the sense the temperature of the heater by means of a thermistor. However, if the temperature of the heater is allowed to vary over any substantial range, the power dissipated from the heater and its temperature respond as complex and relatively insensitive functions of fluid velocity rather than as a substantially linear functions thereof. Thus, in such prior art systems, it was typically difficult to obtain the sensitivity and accuracy desired for defrost control applications.

Among the several objects of the present invention may be noted the provisions of highly sensitive apparatus for sensing differences between the relative velocities of a fluid flowing in a pair of flow paths; the provision of such apparatus which senses variations in fluid velocity by means of the corresponding variations in power dissipation from a pair of thermistors; the provision of such apparatus in which the power dissipated from each of the heaters varies as a substantially linear function of the fluid velocity in the respective path; the provision of apparatus for automatically defrosting a heat exchange surface in refrigeration apparatus; the provision of such apparatus which is highly reliable; and the provision of such apparatus which is relatively simple and inexpensive. Other objects and features will be in part apparent and in part pointed out hereinafter.

Briefly, apparatus of this invention is operative to sense differences between the relative velocities of a fluid flowing in first and second fluid flow paths. The apparatus includes first and second thermistors which are in heat exchange relationship respectively with the fluid flowing in the first and second paths. The thermistors are constructed of a semiconductor material having a transition temperature above which the resistance of the material rises abruptly. Current is applied to the thermistors to cause them to self-heat and the abruptly rising resistance characteristic of the semiconductor material causes the thermistors to be self-regulating substantially at the transition temperature. As the flowing fluid carries heat away from the thermistors, the power dissipated from each thermistors varies as a function of the fluid velocity in the respective path. The apparatus includes means for sensing the relative amounts of power consumed by the thermistors and thus a difference between the respective power consumptions of the two thermistors is a measure of the difference between the fluid velocities in the two paths.

The invention accordingly comprises the constructions hereinafter described, the scope of the invention being indicated in the following claims.

In the accompanying drawings in which several of various possible embodiments of the invention are FIG. 1 is a view in section of refrigeration apparatus employing a defrost control of this invention;

FIG. 3 is a schematic circuit diagram of another embodiment of a defrost control of this invention.

Corresponding reference characters indicate corresponding parts throughout the several views of the drawings.

Figure 1:
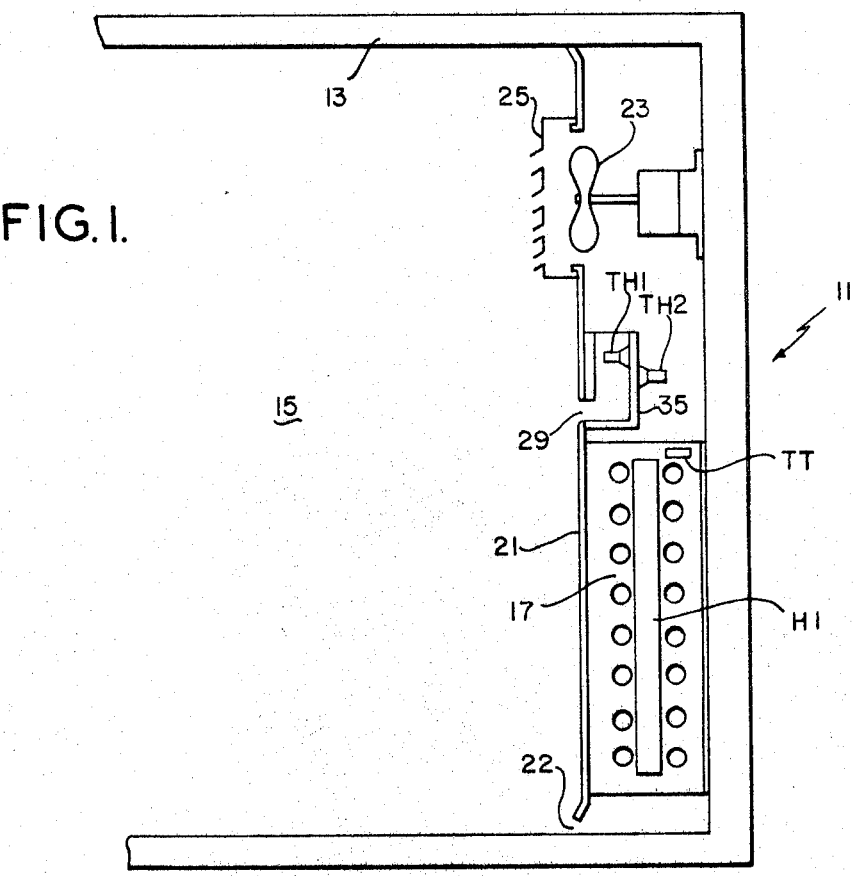

Referring now to FIG. 1, there is indicated at 11 generally refrigeration apparatus of generally conventional construction. Refrigeration apparatus 11 includes an insulated box 13 defining a space or zone 15 which is to be maintained at a preselected temperature. The refrigeration apparatus also includes a conventional compressor and condenser (not shown) and a conventional evaporator 17. The evaporator 17 is contained in a compartment which is separated from zone 15 by a panel or bulkhead 21. Air from zone 15 is admitted to the evaporator 17 through a slot 22 at the bottom of bulkhead 21. A fan 23 draws air through the evaporator 17 and then blows it out through a grill 25 back into zone 15.

Bulkhead 21 also includes a relatively small aperture 29 which permits a portion of the total air flow induced by fan 23 to bypass the evaporator 17. Mounted on the back of bulkhead 21 over aperture 29 is a differential air flow sensor designated generally as 35. Sensor 35 includes a first thermistor TH1 which is located in the bypass air flow path and is thus in heat exchange relationship with air flowing through aperture 29. The sensor also includes a second thermistor TH2 which is located in the path of air flowing through evaporator 17 and is thus in heat exchange relationship with that air. As is explained in greater detail hereinafter, thermistors TH1 and TH2 are operated in a self-heating mode so that they dissipate heat to the respective fluid flows, the amount of heat dissipated from each being variable as a function of the respective fluid velocity.

A heater H1 is mounted on the evaporator 17. Heater H1 functions as a defroster and, when energized, heats the evaporator to remove frost therefrom. A thermostat TT is also mounted in heat exchange relationship to evaporator 17 to sense the temperature rise which occurs when defrosting is completed. Heater H1 and thermostat TT are conventional and are of the type employed in other kinds of automatic defrosting systems, e.g., those controlled by timers or door opening counters.

The size of aperture 29 is chosen so that, when evaporator 17 is relatively free of frost, the air velocities past the two thermistors will be about the same and thus the dissipations of the two thermistors will also be about the same. If, however, frost builds up on the evaporator 17 to any substantial extent, air flow through the evaporator is obstructed and thus the amount of heat carried away by the air passing thermistor TH2 is reduced. Thermistors TH1 and TH2 are interconnected in a circuit as illustrated in FIG. 2 for automatically energizing the defrost heater H1 when this occurs.

Figure 2:
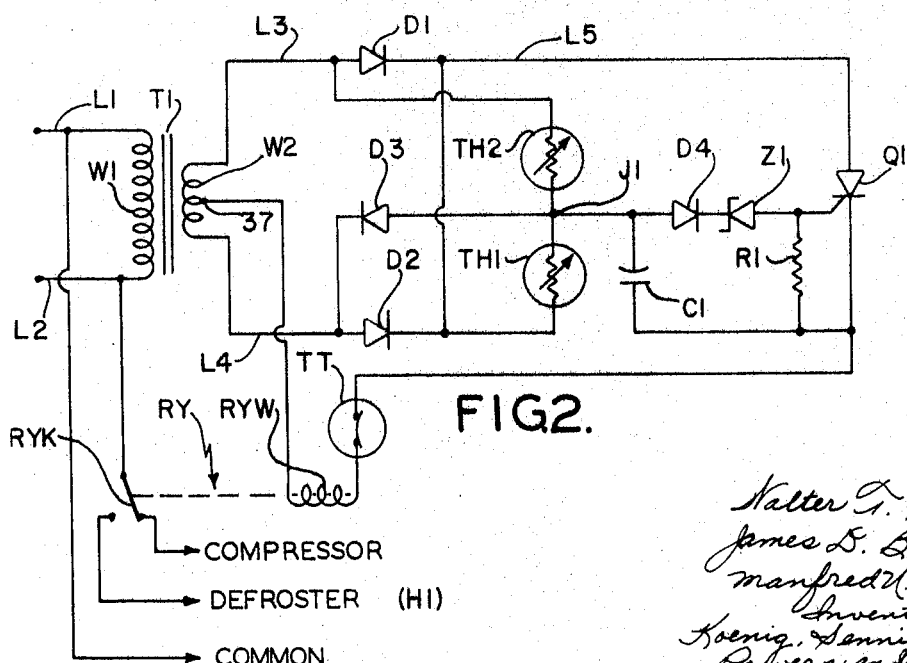
FIG. 2 is a schematic circuit diagram of the defrost control of FIG. 1.

Referring now to FIG. 2, A.C. power for energizing the circuit is provided through a pair of supply leads L1 and L2. The primary winding W1 of a transformer T1 is connected across leads L1 and L2. Transformer T1 includes a secondary winding W2 providing a source of A.C. at a voltage suitable for semiconductor circuitry and this winding has a center tap 37 which constitutes local ground for the relay circuit described hereinafter. The opposite ends of winding W2 provide out-of-phase A.C. voltages at a pair of leads L3 and L4 with respect to center tap 37. Full-wave rectified current is supplied to a lead L5 from winding W2 by a pair of diodes D1 and D2.

Thermistors TH1 and TH2 are connected in series between leads L3 and L5 so that, on those A.C. half cycles when lead L4 is positive with respect to ground, the thermistors effectively comprise a voltage divider which provides at a junction J1 a voltage which varies as a function of the relative resistances of the thermistors. Junction J1, however, is also connected to lead L4 through a diode D3 which functions as a current steering means. Thus, on those A.C. half cycles when lead L4 is negative with respect to ground, the thermistors are effectively connected in parallel between lead L5 and lead L4 and each of the thermistors is subjected to substantially the entire voltage provided by winding W2 during such A.C. half cycles. This application of the full source voltage causes the thermistors TH1 and TH2 to self-heat.

Thermistors TH1 and TH2 are constructed of a semiconductor material, e.g., barium titanate doped with lanthanum, which has a transition temperature above which the resistance of the material rises relatively abruptly. In other words, only a negligible change in temperature is required to produce a large change in resistance once the transition temperature is reached. As is known in the art, thermistors constructed of such a material will function as self-regulating heaters when energized from a voltage source since the abruptly rising resistance characteristic causes the power consumed by the thermistor to fall off when the transition temperature is reached. Thus an equilibrium between power consumption and power dissipation is automatically or inherently maintained at the equilibrium temperature. Although thermistors TH1 and TH2 are energized by the full source voltage of winding W2 only on alternate A.C. half cycles, the thermal inertia of these elements is sufficient to prevent any significant change in their temperatures between such half cycles.

The operating winding RYW of a relay RY is connected between center tap 37 and lead L5 through a circuit which includes the evaporator thermostat TT and the anode-cathode circuit of an SCR (silicon controlled rectifier) Q1 which functions as a semiconductor current switching means. The junction J1 between the thermistors TH1 and TH2 is connected to the gate of SCR Q1 through a diode D4 and a Zener or breakdown diode Z1. The gate-cathode circuit of SCR Q1 is shunted by a resistor R1 and junction J1 is connected to the cathode of SCR Q1 through a capacitor C1.

Relay winding RYW controls a set of contacts RYK which are connected to selectively energize either the refrigeration compressor circuit or the defroster (heater H1) from leads L1 and L2.

The operation of this circuit is substantially as follows: On those A.C. half cycles when lead L4 is positive, the thermistors TH1 and TH2 are self-heated to their transition temperature as noted previously. As was explained with reference to FIG. 1, the power dissipated from each thermistor varies as a function of the air flow velocity past that thermistor. Further since the thermistors TH1 and TH2 are self-regulating and remain at a fixed predetermined temperature, it can be seen that the heat dissipation from each thermistor varies as a substantially linear function of the air velocity in the respective flow path. As the thermistors maintain themselves at the transition temperature by varying their resistances to match power consumption with power dissipation, it can also be seen that the resistance of each thermistor varies as a sensitive function of the respective air flow velocity even though the temperatures of the thermistors vary insignificantly.

When evaporator 17 is relatively free of frost so that the air velocities in the two paths are substantially equal, the resistances of the thermistors TH1 and TH2 are also substantially equal. Thus, on those A.C. half cycles when lead L4 is negative with respect to ground and the thermistors are functioning as a voltage divider, the voltage at the junction J1 will be substantially equal to ground potential. Accordingly, the voltage across Zener diode Z1 will be insufficient to cause conduction therethrough to trigger SCR Q1 and the contacts RYK will thus remain in the position shown in FIG. 2. The refrigeration compressor can then be operated in conventional manner to maintain the temperature in the zone 15 at a preselected temperature.

If, however, evaporator 17 becomes clogged with frost, the flow of air therethrough will be obstructed and the heat dissipation from thermistor TH2 will be reduced. The resistance of thermistor TH2 will thus automatically increase to maintain the thermistor at the transition temperature by reducing power consumption to equal the reduced dissipation. Obstruction of evaporator 17 by frost also causes an increase in the air flow through the bypass opening 29 since a portion of the air which would have otherwise gone through the evaporator will then pass through the aperture 29. Dissipation from thermistor TH1 is thus increased and its resistance will fall to match power consumption with power dissipation at the fixed transition temperature.

Under such conditions of unequal air velocities, the resistance of thermistor TH1 then becomes substantially lower than that of thermistor TH2. Accordingly, on those A.C. half cycles when the lead L4 is positive with respect to ground, the junction J1 will rise to a voltage which is high enough to cause conduction through diode D4 and Zener diode Z1 thereby triggering SCR Q1 into conduction. When SCR Q1 conducts, relay winding RYW is energized and the contacts RYK are moved to a position opposite that shown in FIG. 2 so that the compressor circuit is deenergized and the defroster is energized.

The inductive reactance of winding RYW causes the SCR Q1 to be forward biased between successive ones of the rectified half cycles so that the SCR is effectively maintained in a conductive state. Winding RYW is thus kept energized without requiring continual application of triggering signals to the gate of the SCR. Thus, as the energization of heater H1 removes frost from evaporator 17, the increased flow of air through the evaporator will not, of itself, cause the relay to be deenergized.

When substantially all of the frost is removed so that the temperature of the evaporator rises, thermostat TT opens thereby deenergizing the relay winding RYW and removing the forward bias from SCR Q1 so that the SCR returns to a nonconducting state. When the relay is deenergized, the compressor can again be operated to maintain the temperature in zone 15 at a predetermined level.

If, in place of the relay RY with its inductive winding RYW, it is desired to employ a thermal relay or so-called warp switch, continued forward biasing of the SCR Q1 may be provided by adding a filter capacitor between lead L5 and center tap 37 so as to provide a relatively steady source of D.C. to SCR Q1 which will cause it to latch into a conductive state when triggered.

In the embodiment of FIG. 2 just described, the sensing thermistors TH1 and TH2 are connected as a voltage divider during the sensing portion of each A.C. cycle to provide a voltage signal which varies as a function of the relative amounts of power dissipated by the thermistors. As an alternative, the currents drawn by the sensing thermistors may be employed as signals which are representative of the respective power dissipations. An embodiment employing such a mode of operation is illustrated in FIG. 3. The currents drawn by the sensing thermistors are employed to operate a differential thermal relay 41 when the air flow through the evaporator 17 becomes obstructed. The differential relay 41 comprises a first heater H3 which is connected in series with thermistor TH2 across leads L1 and L2 and which is in heat exchange relationship with or thermally coupled to a bimetallic blade actuator 43. A second heater H4 is connected in series with thermistor TH1 across leads L1 and L2 and is in heat exchange relationship with a bimetallic blade actuator 45. The bimetallic blades 43 and 45 are oriented so that, when they are heated, they tend to flex or exert forces in opposite directions, that is, the free end of the blade 43 pulls to the left and the free end of the blade 45 pulls to the right. The free ends of blades 43 and 45 are coupled together and to a movable relay contact 51 by a link indicated at 52.

Movable contact 51 is oriented so as to be engageable with one or the other of a pair of fixed contacts 53 and 55 and is preferably provided with a mechanical snap-acting mechanism (not shown) so that the transition from one to the other of the fixed contacts occurs abruptly. Fixed contacts 53 and 55 are connected for alternately energizing a refrigeration compressor circuit and a defroster respectively from leads L1 and L2.

The operation of this control is substantially as follows. When an evaporator 17 is relatively free of frost so that the sensing and reference air flows are at substantially the same velocity, the power dissipations of thermistors TH1 and TH2 are substantially equal. Thus, the currents through the two thermistors will be about the same and the heaters H3 and H4 will be equally energized. Accordingly, the opposing forces exerted by the bimetallic blade actuators 43 and 45 will be balanced and the compressor may be operated in conventional manner to maintain the temperature in zone 15 at the preselected level. If, however, frost builds up on evaporator 17 so that the air flow past thermistor TH2 is reduced, the reduced dissipation of this thermistor at its constant temperature will cause its current drain to fall off so that the energization of relay heater H3 is reduced. Simultaneously, the energization of heater H4 will be increased due to the increased air flow through the bypass aperture 29 which increases the dissipation from thermistor TH1. The increased heating applied to bimetallic blade actuator 45 relative to the decreased heating applied to bimetallic blade actuator 43 causes a net force to be developed which pulls the movable relay contact 51 to the right and causes the defroster to be energized. In this embodiment, the force differential of the snap operated movable contact 51 is employed to maintain the energization of the defroster for a period long enough to substantially remove the accumulated frost. As the thermistors TH1 and TH2 are operated directly from the supply voltage provided at leads L1 and L2, it will be understood by those skilled in the art that the nominal impedances and power handling capacities of these elements are chosen with respect to the amplitude of the source voltage and the load impedances constituted by the heaters H3 and H4. It is an advantage of employing self-heating self-regulating thermistors that relatively high levels of power are available from sensing and control functions and thus extensive amplification is unnecessary.

While the differential flow sensing apparatus of this invention has been illustrated in the context of a refrigeration defrost control, it will be understood that the invention may be utilized in other measuring and control applications, e.g., for detecting clogged filters in dryers and ventilation systems. Similarly, differential flow rates in fluids other than air may be sensed.

In view of the above, it will be seen that the several objects of the invention are achieved and other advantageous results attained.

As various changes could be made in the above constructions without departing from the gist of the invention, it is intended that all matter contained in the above description or shown in the accompanying drawings shall be interpreted as illustrative.

What is claimed is:

1. Apparatus for sensing differences between the relative velocities of a fluid flowing in first and second fluid flow paths, said apparatus comprising:

first and second thermistors in heat exchange relationship respectively with the fluid flowing in said first and second paths, said thermistors being comprised of a semiconductor material having a transition temperature above which the resistance of the material rises relatively abruptly; and circuit means for applying current to said thermistors thereby to cause said thermistors to self-heat, the power dissipated from each thermistor varying as a function of the fluid velocity in the respective path, the abruptly rising resistance characteristic of said material causing said thermistors to be self regulating substantially at said transition temperature whereby the power consumed by each of said thermistors also varies as a function of the fluid velocity in the respective path, said circuit means including means for sensing the relative amounts of power consumed by said thermistors whereby a difference between the respective power consumptions of the thermistors is a measure of a difference between the fluid velocities in the two flow paths.

2. Apparatus as set forth in claim 1 wherein said thermistors are interconnected in a voltage divider for providing a voltage signal which varies as a function of the relative resistances of said thermistors and wherein said means for sensing the relative amounts of power consumed is responsive to said voltage signal.

3. Apparatus as set forth in claim 2 wherein said means for sensing the relative amounts of power consumed includes an SCR and means for triggering said SCR when said voltage signal passes a predetermined threshold.

4. Apparatus as set forth in claim 3 including relay means energized by said SCR.

5. Apparatus as set forth in claim 4 including means for providing full-wave rectified A.C. to said SCR and wherein said relay means includes an inductive winding which sustains conduction through said SCR between successive A.C. half cycles.

6. Apparatus as set forth in claim 5 including means for selectively cutting off current flow through said SCR to deenergize said relay.

7. Apparatus as set forth in claim 1 including means providing a source of alternating current to said thermistors and including also diode current steering means for connecting said thermistors in parallel across said source during A.C. half cycles of one polarity and for connecting said thermistors in a serial voltage divider circuit during the A.C. half cycles of opposite polarity.

8. Apparatus as set forth in claim 1 wherein said means for sensing the relative amounts of power consumed comprises a differential relay.

9. Apparatus as set forth in claim 8 wherein said relay comprises a pair of bimetal actuators which, when heated, exert forces in opposite directions and respective resistance heaters in heat exchange relationship with said bimetal actuators, each of said heaters being connected in series with a respective one of said thermistors.

10. In refrigeration apparatus having a heat exchange surface which is subject to frost buildup, a defroster adapted when energized to remove frost from said surface, and means for moving a fluid across said surface to cool said fluid; an automatic defrosting system comprising:

means defining a first flow path for said fluid which becomes relatively obstructed by the buildup of frost on said surface and a second flow path for said fluid which remains relatively unobstructed as frost builds up on said surface;

first and second thermistors comprised of a semiconductor material having a transition temperature above which the resistance of the material rises abruptly, said first and second thermistors being in heat exchange relationship respectively with the fluid flowing in said first and second paths;

circuit means for applying current to said thermistors thereby to cause said thermistors to self-heat, the power dissipated from each thermistor being variable as a function of the fluid velocity in the respective path, the abruptly rising resistance characteristic of said material causing said thermistors to be self-regulating substantially at said transition temperature whereby the power consumed by each of said thermistors varies as a substantially linear function of the fluid velocity in the respective path, said circuit means including means for energizing said defroster when the power consumed by said first thermistor decreases in relation to the power consumed by said second thermistor due to obstruction of the respective fluid flow path whereby, when frost accumulates on said surface in excess of a predetermined level and obstructs fluid flow past said first thermistor, said defroster is energized to remove the frost.

11. A defrosting system as set forth in claim 10 in which said circuit means includes a source of alternating current and diode current steering means for connecting said thermistors in parallel across said source during A.C. half cycles of one polarity and for connecting said thermistors in a serial voltage divider during A.C. half cycles of opposite polarity, said circuit means including semiconductor current switching means responsive to the voltage provided by said divider during said A.C. half cycles of opposite polarity for selectively energizing said defroster.

12. A defrosting system as set forth in claim 10 wherein said circuit means include a differential thermal relay having contact means for selectively energizing said defroster; a pair of bimetal actuators which, when heated, exert forces in opposite directions for operating said contact means; and respective heaters in heat exchange relationship with said actuators, each of said heaters being connected in series with a respective one of said thermistors.

References Cited
UNITED STATES PATENTS

| | | | |
|---|---|---|---|
| 3,039,278 | 6/1962 | Thompson | 62—140 |
| 3,220,208 | 11/1965 | Oram | 62—140 |
| 3,222,882 | 12/1965 | Sutton | 62—140 |

MEYER PERLIN, Primary Examiner

U.S. Cl. X.R.

62—276